Feb. 7, 1933.  S. VITALE ET AL  1,896,209
BRAKE MECHANISM
Filed June 4, 1931   2 Sheets-Sheet 1
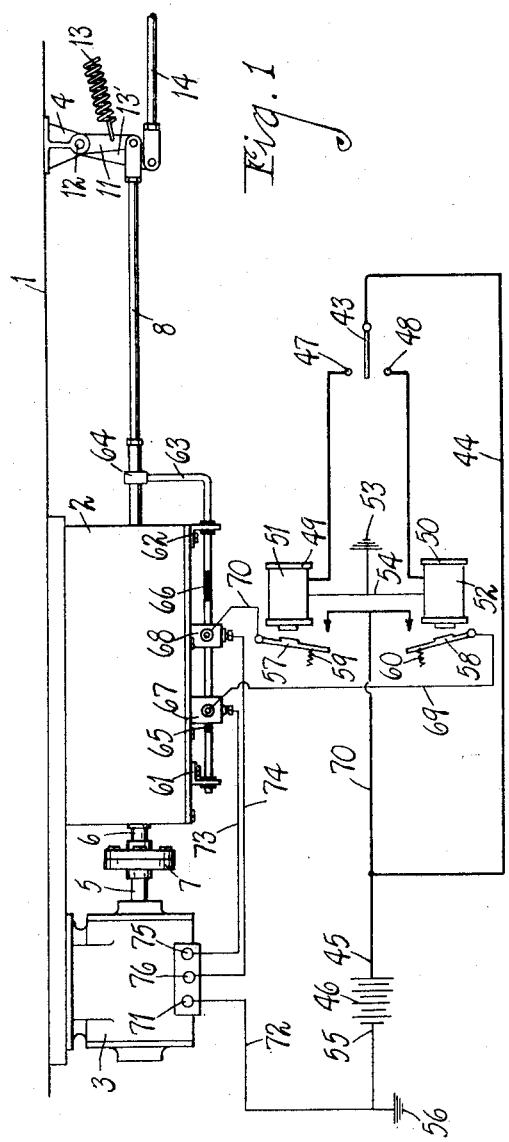
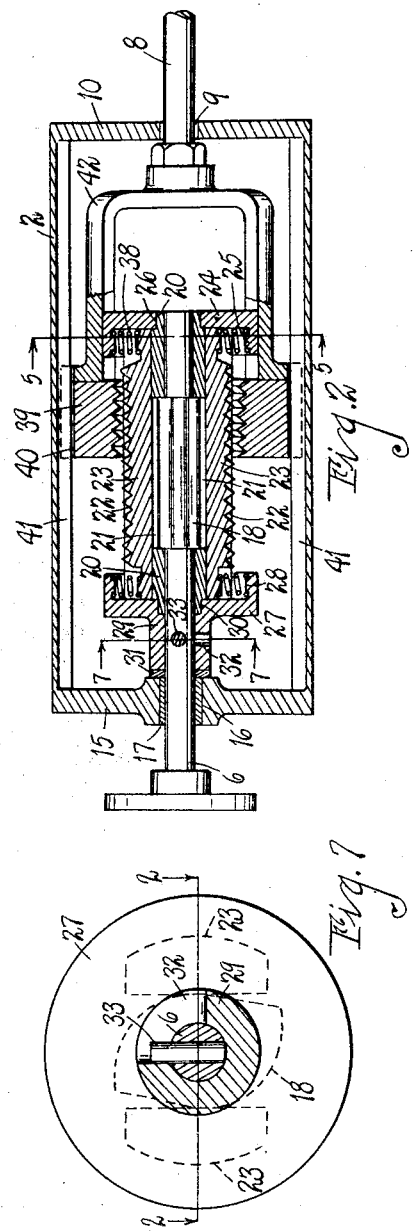
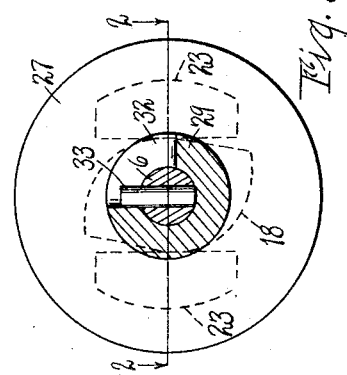
INVENTOR
Samuel Vitale
BY Earl M. Wilson
Chappell Earl
ATTORNEYS Feb. 7, 1933. S. VITALE ET AL 1,896,209
BRAKE MECHANISM
Filed June 4, 1931 2 Sheets-Sheet 2

INVENTOR
Samuel Vitale
BY Earl M. Wilson
Chappell & Earl
ATTORNEYS

Patented Feb. 7, 1933

1,896,209

UNITED STATES PATENT OFFICE

SAMUEL VITALE AND EARL M. WILSON, OF CHARLOTTE, MICHIGAN

BRAKE MECHANISM

Application filed June 4, 1931. Serial No. 542,114.

The main objects of the invention are:

First, to provide a remote brake control for vehicle trailers and the like.

Second, to provide in such a mechanism a quick release for the brake.

Third, to provide a brake control which is positive in operation, economical to manufacture, and simple to construct.

Fourth, to provide means in a device of this class for automatically limiting the travel of the brake rod, regardless of the manipulation of the manually controlled switch.

Objects relating to details and economies of the invention will appear from the description to follow. The invention is defined and pointed out in the claims.

A structure which is a preferred embodiment of our invention is illustrated in the accompanying drawings, in which:

Fig. 1 is a fragmentary side elevation of the brake mechanism with parts shown conventionally and diagrammatically.

Fig. 2 is a longitudinal section taken on line 2—2 of Figs. 4, 5 and 7.

Fig. 7 is a transverse section taken on line 7—7 of Fig. 2.

Figure 4:
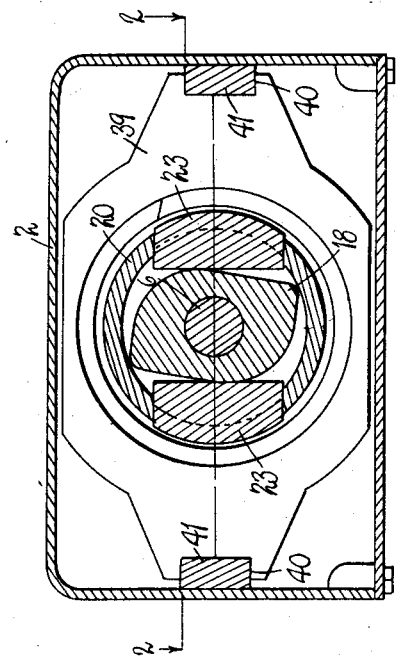
Fig. 4 is a view similar to Fig. 3 showing the cam in neutral position.

In the drawings, numeral 1 indicates the bottom of a trailer with which the device is associated.

The device comprises a housing 2 and an electric motor 3 preferably disposed in alinement. A rockshaft hanger 4 is provided. The shaft 5 of the motor 3 is connected to the shaft 6 by a universal joint coupling 7 shown conventionally.

The brake connecting rod 8 extends through an opening 9 provided in the end 10 of the housing 2 and is connected at its outer end to an arm 11 on the rockshaft 12 journaled to the hanger 4. A tension spring 13 having one end connected to the arm 11 on the rockshaft and the other to any suitable support, not shown, urges the brake rod 8 to a non-braking position. The rockshaft 12 is provided with an arm 13' secured thereto which is connected to the brake of the vehicle by a connecting rod 14.

The driving shaft 6 is journaled to the end 15 of the housing 2 in an opening 16 provided therefor having a suitable bearing 17. The shaft 6 is provided with a cam 18 secured thereto by a pin 19.

A driving head member 20 is mounted on the shaft 6 for limited rotative movement relative thereto, and is provided with an opening 21 for the cam 18 and longitudinal grooves 22 for guiding the radial movement of a pair of segmental externally threaded screws 23 when forced outwardly by the double-lobed cam 18.

A collar 24 having an inwardly facing annular flange 25 is secured to the end of the member 20 at 26. A similar collar 27 having an inwardly facing annular flange 28 and an outwardly extending hub or sleeve 29 is secured to the other end of the member 20 at 30. A thrust bearing 31 is provided between the end of the hub 29 and the housing. The hub 29 is provided with a radial 90-degree slot 32. A pin 33 carried by the shaft 6 extends into the slot 32 and is adapted to be moved freely therein until the pin engages the ends of the slot, whereupon the parts are rotated as a unit. This arrangement provides a lost motion connection for the shaft to the screw, the purpose of which will appear later.

Figure 5:
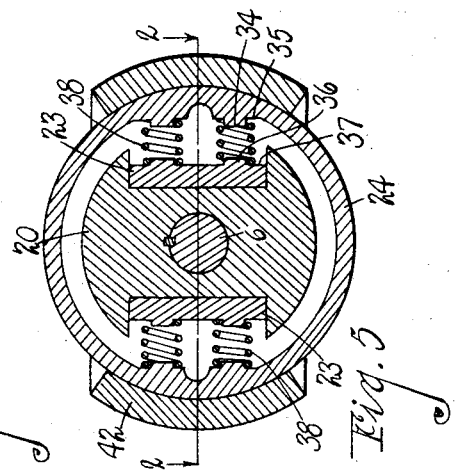
Fig. 5 is a transverse sectional view taken on line 5—5 of Figs. 2 and 6.

The collars 24 and 27 are provided with short studs 34 surrounded by spring seats 35 which face similar opposed short studs 36 and spring seats 37 formed at the ends of the screw segments 23 as shown by Fig. 5.

Compressing springs 38 are mounted on the studs between the opposite seats on the collars and the screw segments respectively which springs urge the screw segments inwardly. The strength of the springs 38 is preferably such that when the cam 18 is turned to an inoperative position as shown in Fig. 4, the springs 38 force the segments to their extreme inner position.

Figure 3:
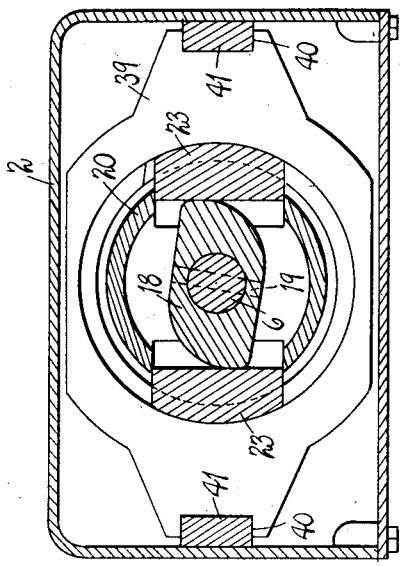
Fig. 3 is a transverse section taken on line 3—3 of Fig. 6.
Figure 6:
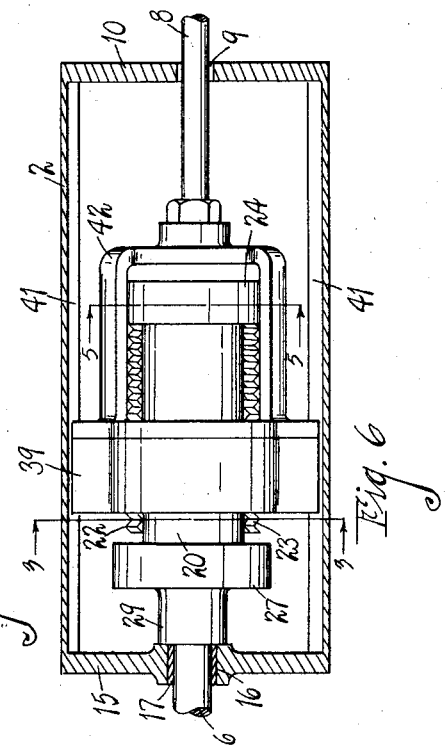
Fig. 6 is a fragmentary view partially in longitudinal section and partially in elevation showing the traveling nut in braking position.

A driven member or traveling nut 39 encircles the screw segments 23 and is provided with internal threads which are adapted to register with the external threads on the screw segments when the latter are forced into engagement therewith by the turning of the cam 18, as shown by Fig. 3. The traveling nut 39 is provided with opposed grooves 40 which register with tracks 41 mounted on opposite sides of the housing 2. The ways or tracks 41 and the grooves 40 coact to guide the longitudinal movement of the traveling nut 39 in the housing 2.

A yoke 42 is carried by the nut 39 for connecting the latter to the brake rod 8. The yoke has segmental bearings for the inner flange 26.

In operation, when the motor 3 is rotated in a forward direction, the shaft 6 turns the pin 33 a quarter of a turn which is sufficient to cause the cam 18 to force the screw segments 23 into engagement with the traveling nut 39. The pin 33 then engages the end of the slot 32 and causes the sleeve 29, the collar 27, the member 20 and the screw segments 23 to rotate with the shaft 6. The rotation of the screw segments when in engagement with the traveling nut 39 causes the latter to be moved longitudinally of the shaft 6 thereby moving the brake rod 8 to a braking position.

When the motor is operated in a reverse direction, the shaft 6 moves the pin 33 in the slot 32 until it engages the other side thereof. This movement disengages the cam from the segments 23 and permits the springs 38 to force the segments out of engagement with the traveling nut 39. This leaves the traveling nut free to be moved to an initial or non-braking position by the tension spring 13.

The control of the motor 3 preferably comprises a manually operable switch 43 having one terminal connected by a conductor 44 to the positive side 45 of a suitable source of electric energy such as a battery 46. The other opposed spaced terminals 47 and 48 of the switch 43 are severally connected to relay coils 49 and 50 of relays 51 and 52 respectively. The other ends of coils 49 and 50 are connected together and to ground 53 by a conductor 54. The other side 55 of the battery 46 is grounded at 56. The relays 51 and 52 are provided with armatures 57 and 58 which are normally urged to an open position by springs 59 and 60.

Spaced brackets 61 and 62 are mounted on the housing 2 for slidably supporting a bar 63 of conducting material mounted at 64 on the brake rod 8 and adapted to travel therewith. The bar 63 is provided with insulated portions 65 and 66 which are adapted to be presented between suitable brushes, not shown, carried by supports 67 and 68 suitably mounted on the housing 2, when the brake rod 8 has reached the limit of its travel in either direction.

The brushes in the supports 67 and 68 are connected by suitable conductors 69 and 70 to one terminal of the armatures 57 and 58 respectively. The other terminals of the armatures are connected by a conductor 70 to the positive side of the battery 46. The other side of the battery 46 is connected to a terminal 71 of the motor 3 by a conductor 72. The other brushes in the supports 67 and 68 are connected by conductors 73 and 74 respectively to terminals 75 and 76 of the motor 3. When the coils of the motor 3 between the terminals 71 and 76 are energized the motor is adapted to operate in one direction and when the coils between the terminals 71 and 75 are energized the motor is adapted to operate in the reverse direction.

In operation when it is desired to cause the mechanism to brake the vehicle the switch 43 is moved so as to engage the terminal 47. This causes the battery 46 to energize the relay coil 49. The relay coil 49 then operates the armature 57 which closes the circuit including the battery 46, and the motor coils between the terminals 71 and 76. The motor 3 is thereby energized by the battery 46 and rotates the shaft 6 to cause the device to pull the brake rod 8 to a braking position as described above. When the brake rod 8 has moved so that the insulating portion 66 on the bar 63 opens the circuit between the brushes inside of the support 67, the energizing circuit to the motor 3 is broken and the latter stops. The mechanism remains in this position until the switch 43 is moved so as to engage the terminal 48. When so moved, the relay coil 50 is energized closing its armature 58 thereby energizing the coils of the motor between the terminals 71 and 75 which causes the armature of the motor to rotate in the reverse direction. This rotation, as described above, releases the traveling nut 39 and the spring 13 immediately returns the brake rod 8 to its initial non-braking position. The motor 3 continues to rotate, however, until the bar 63 moves its insulating portion 65 between the brushes of the support 67 so as to break the energizing circuit to the motor 3.

It will, of course, be understood that the switch 43 is preferably mounted within reach of the driver of the automotive vehicle to which the trailer or the like is attached.

It will be appreciated that we provide positive means for braking and means for immediately resetting the mechanism to a non-braking position when the control switch is operated.

While we have illustrated and described a preferred modification of the invention it is to be understod that various changes may be made therein and other modifications may be made without departing from the invention which is limited only by the prior art and the scope of the following claims.

Having thus described our invention what we claim as new and desire to secure by Letters Patent is:

1. In an apparatus of the class described, the combination with a reversible motor, of a housing having internal opposed parallel ways, an internally threaded driven member slidable in said ways, an actuated member, a spring acting to return said actuated member to initial position, a connecting rod having a yoke secured to said driven member, the arms of said yoke constituting segmental bearing members, a driving shaft connected with said motor, a driving head having a lost motion connection to said shaft, the inner end of said driving head coacting with said bearings of said yoke, segmental screw driving members disposed within said driven member and mounted on said head for radial movement, a double-lobed cam on said shaft acting to actuate said screw driving members to engaged position, and springs acting to disengage said screw driving members from said driven member.

2. In an apparatus of the class described, the combination with a reversible motor, of a housing having internal opposed parallel ways, an internally threaded driven member slidable in said ways, a spring acting to return said driven member to initial position, a driving shaft connected with said motor, a driving head having a lost motion connection to said shaft, segmental screw driving members disposed within said driven member and mounted on said head for radial movement, a double-lobed cam on said shaft acting to actuate said screw driving members to engaged position, and springs acting to disengage said screw driving members from said driven member.

3. In an apparatus of the class described, the combination of parallel ways, an internally threaded driven member slidable in said ways, an actuated member, a spring acting to return said actuated member to initial position, a connecting rod having a yoke secured to said driven member, the arms of said yoke constituting segmental bearing members, a reversible driving shaft, a driving head having a lost motion connection to said shaft, the inner end of said driving head coacting with said bearings of said yoke, segmental screw driving members disposed within said driven member and mounted on said head for radial movement, a cam on said shaft acting to actuate said screw driving members to engaged position, and springs acting to disengage said screw driving members from said driven member.

4. In an apparatus of the class described, the combination of parallel ways, an internally threaded driven member slidable in said ways, a spring acting to return said driven member to initial position, a reversible driving shaft, a driving head having a lost motion connection to said shaft, segmental screw driving members disposed within said driven member and mounted on said head for radial movement, a cam on said shaft acting to actuate said screw driving members to engaged position, and springs acting to disengage said screw driving members from said driven member.

5. In an apparatus of the class described, the combination with a driving shaft and means for driving said shaft in either direction, of a threaded driven member, a coacting threaded driving member mounted on said shaft for movement radially thereof whereby it may be moved into and out of engagement with said driven member and having a lost motion driving connection with said shaft, means on said shaft acting to shift said driving member into engagement with said driven member during the initial movement of the shaft, means for automatically releasing said driving member from said driven member on the reverse movement of said shaft, and means acting to automatically return said driven member to initial position when said driving member is disengaged therefrom.

6. In an apparatus of the class described, the combination with a driving shaft and means for driving said shaft in either direction, of a threaded driven member, a coacting threaded driving member mounted on said shaft for movement radially thereof whereby it may be moved into and out of engagement with said driven member, means acting to shift said driving member into engagement with said driven member during the initial movement of the shaft, means for automatically releasing said driving member from said driven member on the reverse movement of said shaft, and means acting to automatically return said driven member to initial position when said driving member is disengaged therefrom.

7. In an apparatus of the class described, the combination with a driving shaft and means for driving said shaft in either direction, of a threaded driven member, a coacting threaded driving member mounted on said shaft for movement radially thereof whereby it may be moved into and out of engagement with said driven member and having a lost motion driving connection with said shaft, means on said shaft acting to shift said driving member into engagement with said driven member during the initial movement of the shaft, means for automatically releasing said driving member from said driven member on the reverse movement of said shaft.

8. In an apparatus of the class described, the combination with a driving shaft and means for driving said shaft in either direction, of a threaded driven member, a coacting threaded driving member mounted on said shaft for movement radially thereof whereby it may be moved into and out of engagement with said driven member, means acting to shift said driving member into engagement with said driven member during the initial movement of the shaft, means for automatically releasing said driving member from said driven member on the reverse movement of said shaft.

9. A brake actuating apparatus comprising a threaded driving member, a coacting threaded driven member, reversible driving means for said driving member, means acting to automatically engage the threads of said driving and driven members when the driving member is driven in a direction to actuate the driven member to brake actuating position, means acting to release the threads of said driving and driven members on the reversing of said driving means, and means acting to release the brake and return said driven member to initial position when the threads of said driving and driven members are disengaged.

10. A brake actuating apparatus comprising a threaded driving member, a coacting threaded driven member, reversible driving means for said driving member, means acting to automatically engage the threads of said driving and driven members when the driving member is driven in a direction to actuate the driven member to brake actuating position, means acting to release the threads of said driving and driven members on the reversing of said driving means, and means acting to return said driven member to initial position when the threads of said driving and driven members are disengaged.

11. In an apparatus of the class described, comprising a threaded reversely driving member, a coacting threaded driven member, means acting to automatically engage the threads of said driving and driven members when the driving member is driven in a direction to actuate the driven member, means acting to release the threads of said driving and driven members on the reversing of said driving member, and means acting to return said driven member to initial position when the threads of said driving and driven members are disengaged.

12. In an apparatus of the class described, the combination with a reversible motor, of a housing having internal opposed parallel ways, an internally threaded driven member slidable in said ways, an actuated member, a spring acting to return said actuated member to initial position, a connecting rod having a yoke secured to said driven member, the arms of said yoke constituting segmental bearing members, a driving shaft connected with said motor, a driving head having a lost motion connection to said shaft, the inner end of said driving head coacting with said bearings of said yoke, segmental screw driving members disposed within said driven member and mounted on said head for radial movement, a double-lobed cam on said shaft acting to actuate said screw driving members to engaged position, and springs acting to disengage said screw driving members from said driven member, and a bar of conducting material having spaced insulated portions carried by said connecting rod, spaced brackets mounted on said housing, said brackets having brushes contacting with said bar, a source of energy for said motor, and means for connecting said motor to said source comprising a switch having one terminal connected to one side of said source, and a pair of spaced opposite terminals, a pair of relay coils severally connected to said spaced terminals and to the other side of said source, normally open armatures actuated by said relay coils, said armatures being connected to one side of said battery and individually to a brush on individual brackets, the other brushes being connected to normal and reversing terminals of the motor, the other terminal of the motor being connected to the other side of the source, whereby when the switch is closed for braking, one relay closes and causes the source to energize the motor to rotate in a normal direction until the bar moves an insulated portion between the brushes which breaks the energizing circuit of the motor causing it to stop, and when the switch is closed for brake-releasing the motor rotates in reverse direction releasing the actuated member and permitting the spring to return the connecting rod to an initial position, the bar moving an insulated portion between the brushes and de-energizing the motor.

13. In a device of the class described, a motor, a shaft coupled to said motor, a housing having longitudinal splines, a pin carried by said shaft, a collar having a 90° slot for said pin, an annular flange mounted on said shaft, a cam secured to said shaft, a member keyed to said shaft having longitudinal grooves on opposite sides thereof and a transverse hole connecting said grooves, externally threaded keys mounted in said grooves and adapted to be moved therein radially of said shaft by said cam, a collar having an annular flange secured to the end of said shaft, springs between the annular flanges of said collars and the ends of said keys for urging the keys inwardly, an internally threaded traveling nut splined to said longitudinal splines in said housing for longitudinal movement therein when engaged by the external threads of said keys, a yoke secured to said nut, a brake rod connected to said yoke, a spring adapted to return said brake rod, yoke and collar to an initial non-braking position when the threaded connection between said keys and said nut is broken, means for energizing said motor, and motor circuit breaking means for limiting the travel of said nut.

14. In a device of the class described, a reversible motor, a housing having a shaft journaled at one end thereof, means coupling said shaft to said motor, opposed parallel longitudinal tracks carried by opposite inner sides of said housing, a traveling internally threaded nut having opposed slots for said tracks whereby the path of said nut is fixed, a yoke carried by said nut, a brake rod extending through said housing and secured to said yoke, a cam mounted on said shaft, a member rotatably mounted on said shaft having an opening for said cam and a plurality of longitudinal grooves, an externally threaded screw segment radially slidable in each of said grooves under the influence of said cam, resilient means urging said screw segments inwardly, a collar carried by said shaft, means permitting a quarter turn of said shaft free of said collar, means securing said collar to said member, resilient means urging said traveling nut to a normal non-braking position, means for energizing said motor to operation in a forward or reverse direction, and means controlled by the position of said nut for breaking the energizing circuit to said motor.

15. In a device of the class described, the combination with a plurality of screw segments, means for guiding said segments radially, a traveling internally threaded nut encircling said segments, means for guiding said longitudinal nut, a rotatable shaft having a cam adapted to force said segments into engagement with said nut, means for permitting said shaft to rotate sufficiently to turn said cam and then connect said shaft to said screw segment to rotate the same in said nut, resilient means urging said segments out of engagement with said nut, and resilient means urging said nut to an initial position, whereby when the direction of rotation of said shaft is reversed said cam is turned, said resilient means disconnects the segments from the nut and immediately returns the nut to an initial position, and automatic means for stopping the rotation of said shaft when said nut is at the limit of its travel in either direction.

16. In a device of the class described, a reversible motor, a brake, means connecting said brake to said motor and actuating said brake when said motor is driven in a positive direction and immediately releasing said brake from said motor when said motor is driven in a negative direction, resilient means for returning said brake to a non-braking position when released, a source of electric energy, relays associated with said source and said motor for energizing said motor to rotate in positive or negative direction when one or the other of said relays is energized, a manually controlled switch for operating said relays, and means controlled by the braking and non-braking position of said brake for de-energizing said motor regardless of the manipulation of said manually controlled switch.

In witness whereof we have hereunto set our hands.

SAMUEL VITALE.
EARL M. WILSON.